US008723758B2

(12) United States Patent
Li et al.

(10) Patent No.: US 8,723,758 B2
(45) Date of Patent: May 13, 2014

(54) DISPLAY DEVICE HAVING SIGNAL INTERNAL LINKS

(75) Inventors: Chung-Lung Li, Hsin-Chu (TW);
Tsang-Hong Wang, Hsin-Chu (TW);
Sheng-Chao Liu, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 767 days.

(21) Appl. No.: 12/581,169

(22) Filed: Oct. 19, 2009

(65) Prior Publication Data

US 2010/0315317 A1   Dec. 16, 2010

(30) Foreign Application Priority Data

Jun. 12, 2009  (TW) ............................... 98119699 A

(51) Int. Cl.
*G09G 3/20*   (2006.01)
*G02F 1/1343*   (2006.01)

(52) U.S. Cl.
USPC ........................................... 345/55; 349/143

(58) Field of Classification Search
USPC ................ 345/55, 58, 87, 90, 100, 204, 205; 349/54, 143, 149, 151, 152
See application file for complete search history.

(56) References Cited

U.S. PATENT DOCUMENTS

| 6,862,008 | B2 * | 3/2005 | Yamazaki et al. ............... 345/62 |
| 7,573,469 | B2 * | 8/2009 | Yamazaki et al. ............. 345/204 |
| 8,284,340 | B2 * | 10/2012 | Park et al. ........................ 349/54 |
| 8,363,192 | B2 * | 1/2013 | Takahashi et al. ............ 349/139 |
| 8,432,349 | B2 * | 4/2013 | Sasaki et al. .................. 345/100 |
| 8,542,161 | B2 * | 9/2013 | Chiang et al. ................... 345/55 |
| 2003/0117563 | A1 * | 6/2003 | Lim .............................. 349/149 |
| 2006/0033691 | A1 | 2/2006 | Ku et al. |
| 2007/0146611 | A1 * | 6/2007 | Kang ............................ 349/149 |
| 2007/0188435 | A1 | 8/2007 | Wen et al. |
| 2010/0066967 | A1 * | 3/2010 | Takahashi et al. ............ 349/143 |
| 2010/0073272 | A1 * | 3/2010 | Yamazaki et al. .............. 345/90 |
| 2010/0171687 | A1 * | 7/2010 | Chiang et al. ................... 345/98 |
| 2010/0188378 | A1 * | 7/2010 | Chiang et al. ................. 345/206 |
| 2011/0122052 | A1 * | 5/2011 | Chen et al. ....................... 345/55 |

FOREIGN PATENT DOCUMENTS

JP   11305681 A   * 11/1999
TW   200604980   2/2006

* cited by examiner

*Primary Examiner* — Rodney Amadiz
(74) *Attorney, Agent, or Firm* — Winston Hsu; Scott Margo

(57) ABSTRACT

A display device includes a substrate, a plurality of first signal lines, a plurality of second signal lines, and a plurality of first signal internal links. The first signal lines and the second signal lines are crossed and disposed in a display region of the substrate. The first signal internal links are disposed in the display region of the substrate, wherein each of the first signal internal links is electrically connected to a corresponding first signal line and disposed between two adjacent second signal lines. Each of the first signal internal links intersects the first signal lines, and the number of intersection points of each of the first signal internal links and the first signal lines is the same.

19 Claims, 4 Drawing Sheets

DISPLAY DEVICE HAVING SIGNAL INTERNAL LINKS

BACKGROUND OF THE INVENTION

1. Field of the Invention

The present invention is related to a display device, and more particularly, to a display device with a uniform loading effect.

2. Description of the Prior Art

A display device (e.g. a liquid crystal display, LCD), includes conducting wires such as gate lines, common lines, data lines, or electrode structures such as pixel electrodes. In terms of circuit layout, whether design driven or due to other inevitable factors, signal interferences occur when the conducting wires are embedded too close to each other, causing a loading effect. When the loading effect does not distribute uniformly throughout each pixel, influences on each pixel may vary; such that an uneven loading effect may severely affect the quality of the display. Therefore, in designing the display device, uneven loading effects should be strongly avoided.

Please refer to FIG. 1. FIG. 1 is a schematic diagram of a conventional display device. As shown in FIG. 1, the conventional display device 10 includes a substrate 12, which includes a display region 12D, a peripheral region 12P, and a chip bonding region 12C. The display device 10 includes a plurality of gate lines 14 and a plurality of data lines 16, disposed at the display region 12D of the substrate 12, wherein the gate lines 14 are perpendicular to the data lines 16, and two adjacent gate lines 14 and two adjacent data lines 16 define a pixel (sub-pixel). The peripheral region 12P of the display device 10 has a chip driver 20 disposed thereon. Each data line 16 has one end extending from the display region 12D to the chip bonding region 12C and electrically connected to the chip driver 20 in order to receive data signals. In contrast, each gate line 14 has one end extending from the display region 12D to the peripheral region 12P and electrically connected to the chip driver 20 disposed in the chip bonding region 12C through a conducting wire 18. Through the conducting wire 18, gate signals from the chip driver 20 are delivered to corresponding gate lines 14.

According to FIG. 1, the gate lines 14 of the display device 10 in the prior art are electrically connected to the chip driver 20 through the conducting wires 18 at the peripheral region 12P; however, due to different loading effects of the conducting wires 18 at the peripheral region 12P, and the scan lines 14 and the data lines 16 at the display region 12D, the display quality of the display device 10 is affected. Furthermore, in order to dispose the conducting wires 18, the display device 10 in the prior art must possess a larger peripheral region 12P, thus a narrow frame design cannot be achieved in this case.

SUMMARY OF THE INVENTION

One of the objectives of the present invention is to design a display device with a narrow frame and a uniform loading effect.

In order to achieve the above mentioned objectives, the present invention provides a display device comprising a substrate, a plurality of first signal lines, a plurality of second signal lines, and a plurality of first signal internal links. The substrate includes a display region. The first signal lines are disposed in the display region of the substrate. The second signal lines are disposed in the display region of the substrate, wherein the second signal lines are intersected with the first signal lines. The first signal internal links are disposed in the display region of the substrate, wherein each of the first signal internal links is electrically connected to a corresponding first signal line and each of the first signal internal links is disposed between the adjacent second signal lines. Each of the first signal internal links intersects with the first signal lines, and the number of intersection points of each of the first signal internal links and the first signal lines is the same.

The present invention modifies the layout of signal lines or adjusts RC delay of parts of the signal lines, achieving equal loading effects on all signal lines, such that the uneven loading effect would not impose a negative effect on the quality of the display. In addition, the present invention utilizes a method of disposing internal links to make possible for a narrow frame display device.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention, preferred embodiments will be detailed as follows. The preferred embodiments of the present invention are illustrated in the accompanying drawings with numbered elements to elaborate the contents and effects to be achieved.

Figure 1:
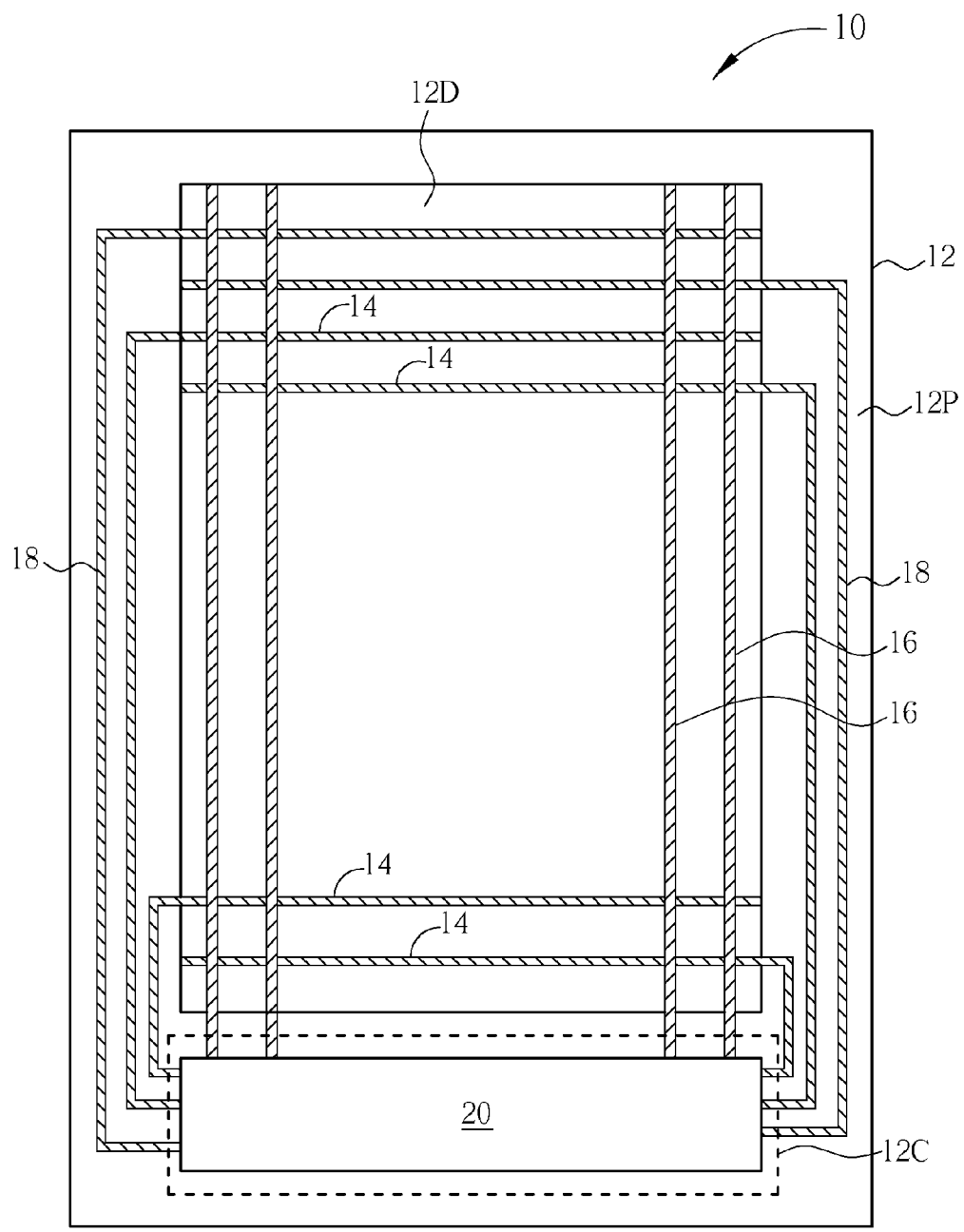
FIG. 1 is a schematic diagram of a conventional display device.
Figure 2:
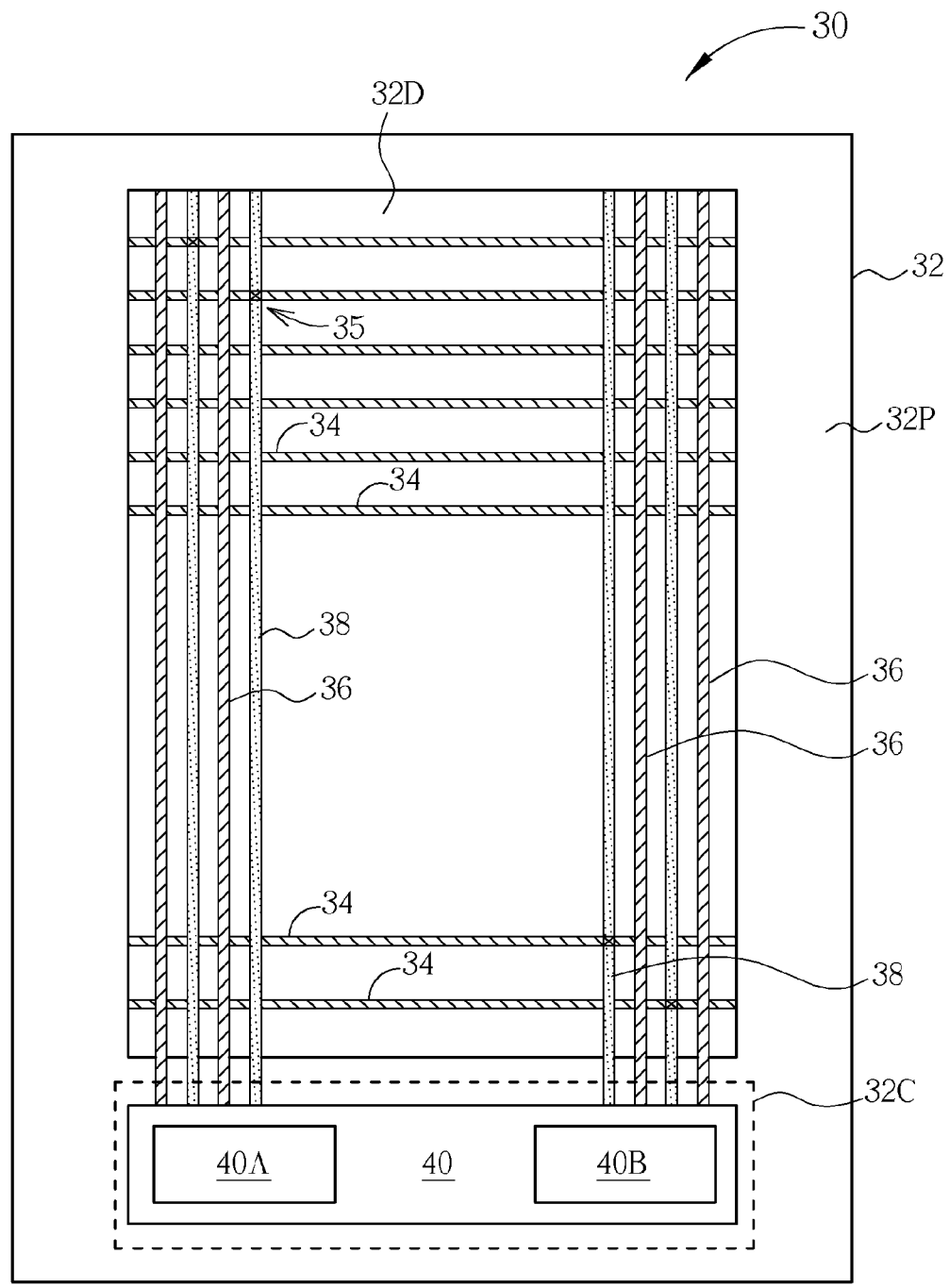
FIG. 2 is a schematic diagram illustrating a display device according to a first preferred embodiment of the present invention.

Please refer to FIG. 2. FIG. 2 is a schematic diagram illustrating a display device according to a first preferred embodiment of the present invention. As shown in FIG. 2, the display device 30 includes a substrate 32, and the substrate 32 has a display region 32D, a peripheral region 32P, and a chip bonding region 32C. In the present embodiment, the display device 30 may be an LCD device, but is not limited, and may be other types of display devices. The display device 30 includes a plurality of first signal lines 34, a plurality of second signal lines 36, and a plurality of first signal internal links 38 disposed in the display region 32D of the substrate 32, wherein each of the first signal internal links 38 is electrically connected to a corresponding first signal line 34. The first signal lines 34 and the second signal lines 36 are crossed as well as substantially perpendicular with each other, and the first signal internal links 38 are substantially parallel to the second signal lines 36. Also, the first signal internal links 38 and the second signal lines 36 are disposed alternately, such that each of the first signal internal links 38 is disposed between the adjacent second signal lines 36, but is not limited. The display device 30 further includes a chip driver 40 disposed in the chip bonding region 32C of the substrate 32, wherein the chip driver 40 includes at least a first signal driver 40A which is electrically connected to the first signal internal links 38, and at least a second signal driver 40B which is electrically connected to the second signal line 36. In the present embodiment, the first signal lines 34 are gate lines, and the second signal lines 36 are data lines. In addition, the first signal driver 40A is a gate driver and the second signal driver 40B is a source driver. By virtue of the first signal internal links 38, the gate driver can provide gate signals to the gate lines through the first signal internal links 38, while the source driver can directly provide data signals to the data lines. The application of the present invention is not limited to the above embodiment. For instance, the first signal lines 34 may be data lines, and the second signal lines 36 may be gate lines. Under these circumstances, data lines are electrically connected with the source driver through the first signal internal links 38, and the gate lines are electrically connected to the gate driver directly.

In the present embodiment, each of the first signal internal links 38 is intersected with the first signal lines 34, and the first signal internal links 38 are substantially equal in length. Therefore each of the first signal internal links 38 overlaps and intersects with all of the first signal lines 34, so as to form intersection points. Also, each of the first signal internal links 38 and the first signal lines 34 have the same number of intersection points. For example, in the present embodiment, if the display device 30 has a resolution of 800*600, the number of the first signal lines acting as the gate line is 600. Out of all the first signal internal links 38, only one is electrically connected to its corresponding first signal line 34 through a contact via 35, and partially overlap but does not electrically connected to the remaining 599 first signal lines 34. Intersecting of the first signal internal links 38 and the first signal lines 34 causes a loading effect due to a coupling effect. Since each of the first signal internal links 38 and the first signal lines 34 have the same number of intersection points, each of the first signal internal links 38 generates a similar loading effect which creates a uniform loading effect for the display device 30 and improves the display quality of the display device 30.

Figure 3:
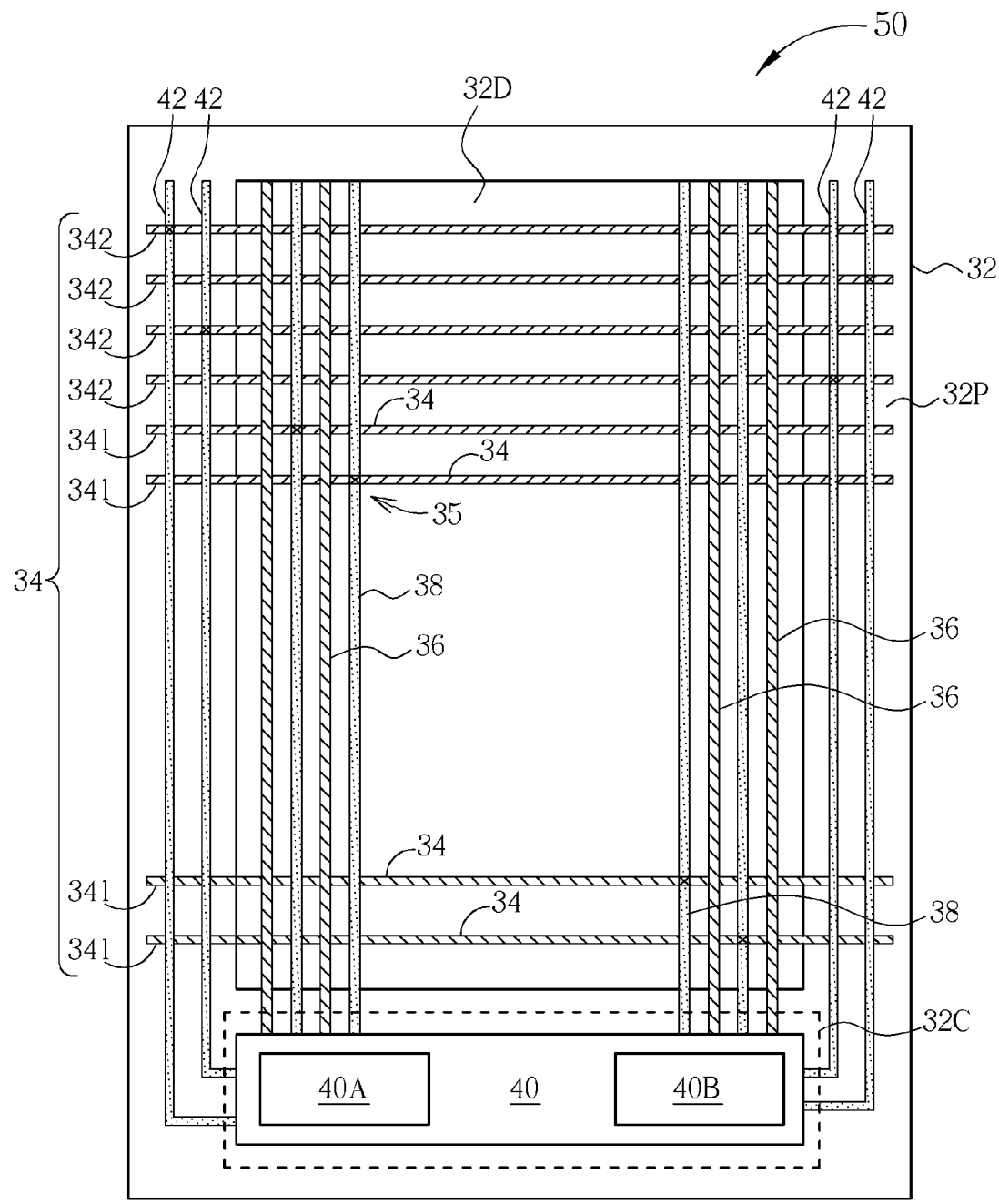
FIG. 3 is a schematic diagram illustrating a display device according to a second preferred embodiment of the present invention.

To simplify the description and for the convenience of comparison between each of the embodiments of the present invention, identical elements are denoted by identical numerals. Also, only the differences are illustrated, and repeated descriptions are not redundantly given. Please refer to FIG. 3. FIG. 3 is a schematic diagram illustrating a display device according to a second preferred embodiment of the present invention. As shown in FIG. 3, under certain resolutions, the number of the first signal internal links 38 and the number of the second signal lines 36 may not match; therefore, the space between the adjacent second signal lines 36 cannot contain the layout of all first signal internal links 38, causing some of the first signal lines 34 unable to electrically connect to the chip drivers 40 through the first signal internal links 38. Therefore, the display device 50 of the present embodiment further includes a plurality of first signal external links 42 disposed in the peripheral region 32P. In the present embodiment, the first signal lines 34 is categorized into a first set of first signal lines 341 and a second set of first signal lines 342, wherein each of the first signal internal links 38 is electrically connected to one of the first signal lines of the first set 341 respectively such that the first signal lines of the first set 341 are electrically connected to the chip drivers 40 through the first signal internal links 38. Also, each of the first signal external links 42 is electrically connected to one of the first signal lines of the second set 342 such that the second set of first signal lines 342 is electrically connected to the chip drivers 42 through the first signal external links 42.

In the present embodiment, two ends of the first set of first signal lines 341 and the second set of first signal lines 342 extend toward the right side and the left side from the display region 32D, and intersect with all the first signal external links 42 such that the number of intersection points of each of the first signal external links 42 and the first signal line 34 is the same as the number of intersection points of each of the first signal internal links 38 and the first signal lines 34, resulting in similar loading effects between the first signal external links 42 and the first signal internal links 38. Therefore, even with the first signal external links 42 disposed, display device 50 may also achieve a uniform loading effect and maintain the quality of display.

Figure 4:
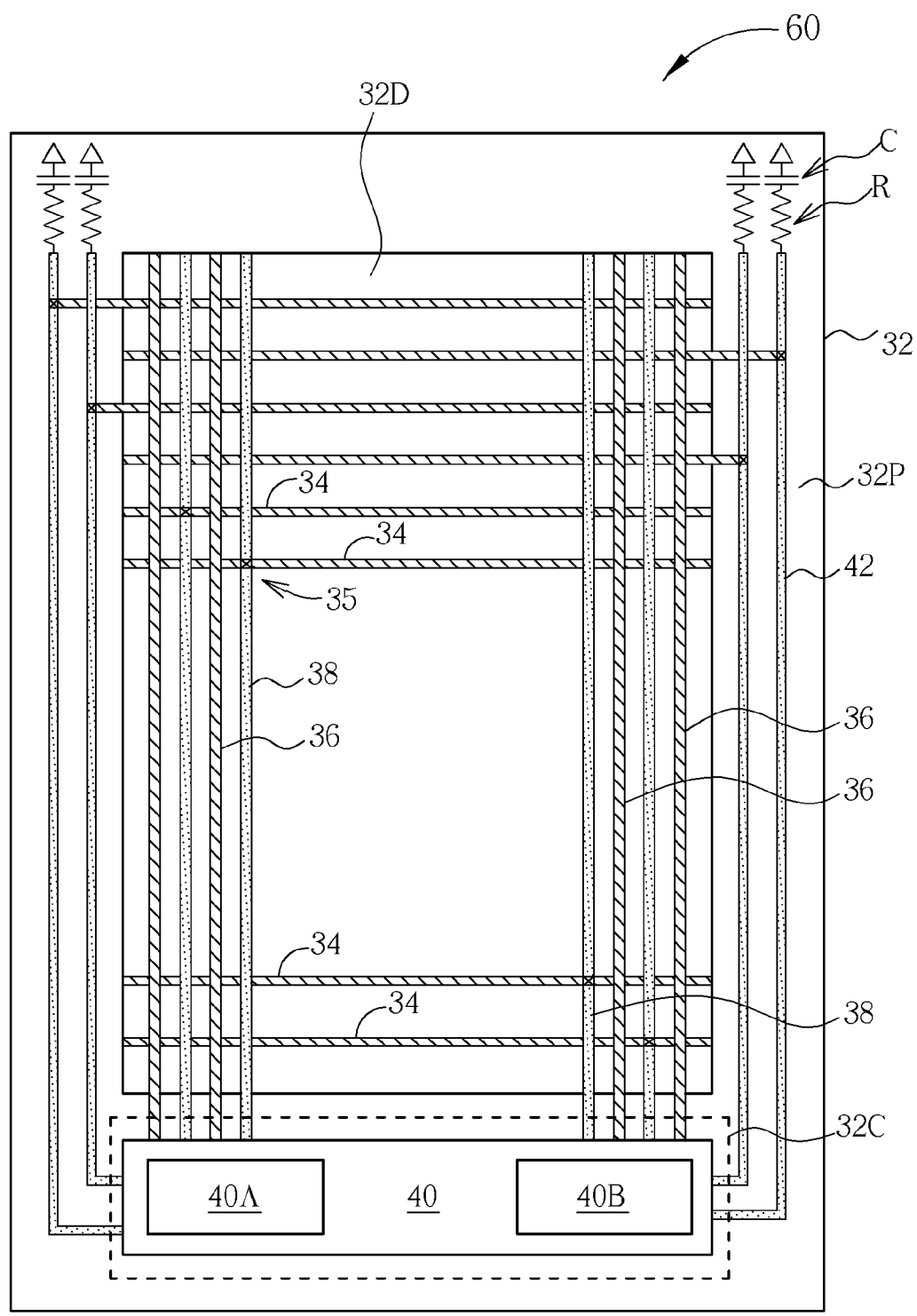
FIG. 4 is a schematic diagram illustrating a display device according to a third preferred embodiment of the present invention.

Please refer to FIG. 4. FIG. 4 is a schematic diagram of a display device according to a third preferred embodiment of the present invention. As shown in FIG. 4, when comparing with the second embodiment, the present embodiment does not utilize the method of extending the first signal lines 34 toward the peripheral region 32P to increase the loading effect of the first signal external links 42. In contrast, in the display device 60 of the present embodiment, the resistance R of the first signal external link 42 is modified or the first signal external link 42 is connected with a capacity C in series in order to adjust loading. For instance, increasing the resistance of the resistor R through adjusting the length or thickness of the first signal external links 42, or connecting one end of the capacitor C to a signal source electrically such as an AC current signal source which adjusts the capacitance of the capacitor C, adjusts the RC delay of the first signal external links 42. Accordingly, the first signal external links 42 and the first signal internal links 38 can have a similar loading effect.

In summary, the present invention achieves an overall similar loading effect through modifying the layout of the signal lines or adjusting the RC delay of the signal lines, such that the quality of the display is not affected by the uneven loading effect. Also, the present invention utilizes the method of disposing internal links to make possible for a narrow frame display device.

Those skilled in the art will readily observe that numerous modifications and alterations of the device and method may be made while retaining the teachings of the invention.

What is claimed is:
1. A display device comprising:
a substrate comprising a display region;
a plurality of first signal lines disposed in the display region of the substrate;
a plurality of second signal lines disposed in the display region of the substrate, wherein the second signal lines are intersected with the first signal lines; and
a plurality of first signal internal links disposed in the display region of the substrate, wherein each of the first signal internal links is electrically connected to a corresponding first signal line and disposed between adjacent second signal lines;
wherein each of the first signal internal links intersects with all of the plurality of first signal lines, and the number of intersection points of each of the first signal internal links and all of the plurality of first signal lines is the same.

2. The display device of claim 1, wherein each of the first signal internal links is substantially parallel to the second signal lines.

3. The display device of claim 1, wherein the first signal lines comprise a plurality of gate lines and the second signal lines comprise a plurality of data lines.

4. The display device of claim 1, wherein the first signal lines comprise a plurality of data lines and the second signal lines comprise a plurality of gate lines.

5. The display device of claim 1, wherein the first signal internal links and the second signal lines are disposed alternately.

6. The display device of claim 1, further comprising a plurality of first signal external links, wherein the substrate further comprises a peripheral region adjacent to the display region, the first signal external links are disposed in the peripheral region, the first signal lines are categorized into a first set of first signal lines and a second set of first signal lines, each of the first signal internal links is electrically connected to one of the first signal lines of the first set, and each of the first signal external links is electrically connected to one of the first signal lines of the second set.

7. The display device of claim 6, wherein each of the first signal external links is substantially parallel to the first signal internal links.

8. The display device of claim 6, wherein each of the first signal lines extends from the display region to the peripheral region, each of the first signal external links intersects the first signal lines, and the number of intersection points of each of the first signal internal external links and the first signal lines is the same.

9. The display device of claim 6, wherein each of the first signal external links is electrically connected with a capacitor.

10. The display device of claim 9, wherein each of the capacitor is connected with an alternating current (AC) source.

11. The display device of claim 6, wherein a resistance of each of the first signal external links is larger than a resistance of each of the first signal internal links.

12. A display device comprising:
a substrate comprising a display region;
a plurality of first signal lines disposed in the display region of the substrate;
a plurality of second signal lines disposed in the display region of the substrate, wherein the second signal lines are intersected with the first signal lines; and
a plurality of first signal internal links disposed in the display region of the substrate, wherein each of the first signal internal links is electrically connected to a corresponding first signal line and disposed between adjacent second signal lines;
wherein each of the first signal internal links intersects with the plurality the first signal lines, and the first signal internal links are substantially equal in length.

13. The display device of claim 12, wherein each of the first signal internal links is substantially parallel to the second signal lines, and the first signal internal links and the second signal lines are disposed alternately.

14. The display device of claim 12, wherein the first signal lines comprise a plurality of gate lines and the second signal lines comprise a plurality of data lines, or the first signal lines comprise a plurality of data lines and the second signal lines comprise a plurality of gate lines.

15. The display device of claim 12, further comprising a plurality of first signal external links, wherein the substrate further comprises a peripheral region adjacent to the display region, the first signal external links are disposed in the peripheral region, the first signal lines are categorized into a first set of first signal lines and a second set of first signal lines, each of the first signal internal links is electrically connected to one of the first signal lines of the first set, each of the first signal external links is electrically connected to one of the first signal lines of the second set, and each of the first signal external links is substantially parallel to the first signal internal links.

16. A display device comprising:
a substrate comprising a display region and a chip bonding region located on one side of the display region;
a plurality of first signal lines disposed in the display region of the substrate and having m rows, wherein the first row of first signal line is disposed far away from the chip bonding region and the $m^{th}$ row of first signal line is disposed closest to the chip bonding region;
a plurality of second signal lines disposed in the display region of the substrate, wherein the second signal lines are intersected with the first signal lines;
a plurality of first signal internal links disposed in the display region of the substrate, wherein each of the first signal internal links is electrically connected to a corresponding first signal line and disposed between adjacent second signal lines; and
a chip driver disposed in the chip bonding region and electrically connected to the first signal links;
wherein each of the first signal internal links intersects with the first row of first signal line.

17. The display device of claim 16, wherein each of the first signal internal links is substantially parallel to the second signal lines, and the first signal internal links and the second signal lines are disposed alternately.

18. The display device of claim 16, wherein the first signal lines comprise a plurality of gate lines and the second signal lines comprise a plurality of data lines, or the first signal lines comprise a plurality of data lines and the second signal lines comprise a plurality of gate lines.

19. The display device of claim 16, further comprising a plurality of first signal external links, wherein the substrate further comprises a peripheral region adjacent to the display region, the first signal external links are disposed in the peripheral region, the first signal lines are categorized into a first set of first signal lines and a second set of first signal lines, each of the first signal internal links is electrically connected to one of the first signal lines of the first set, each of the first signal external links is electrically connected to one of the first signal lines of the second set, and each of the first signal external links is substantially parallel to the first signal internal links.

* * * * *